J. W. MARKHAM.
STEERING WHEEL LOCK.
APPLICATION FILED AUG. 3, 1917.
1,328,882.
Patented Jan. 27, 1920.
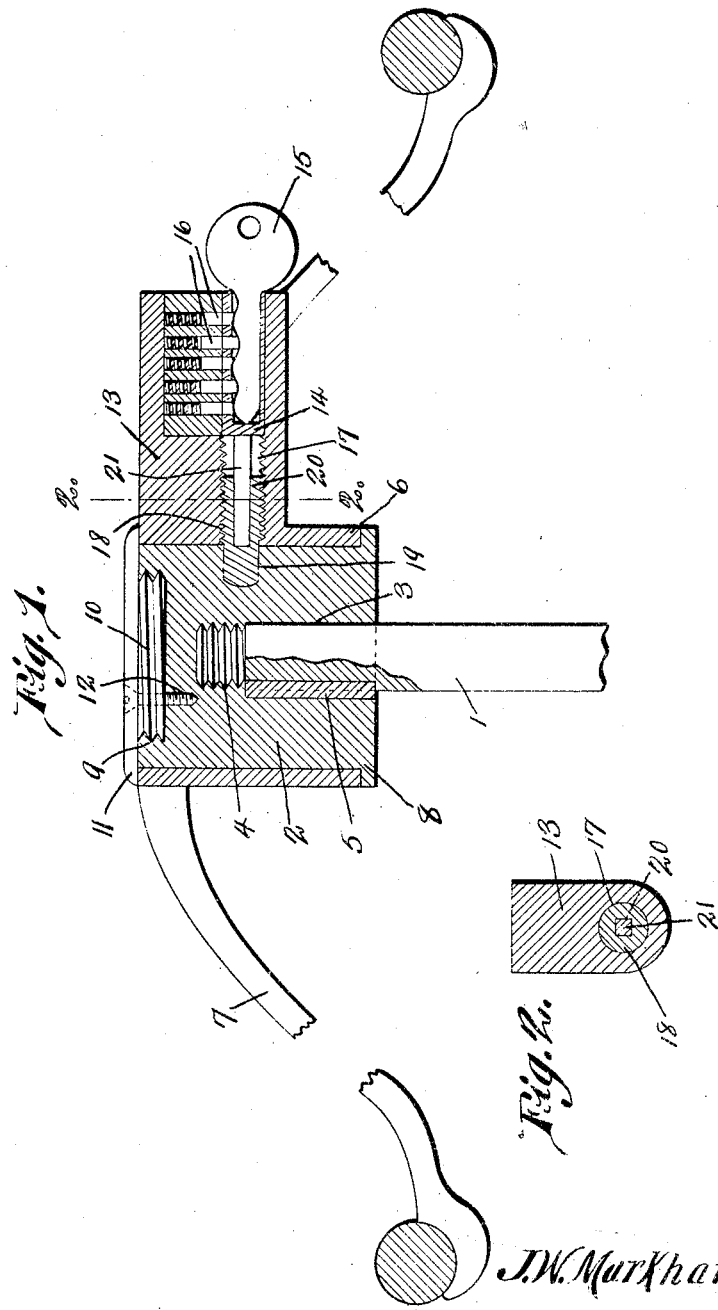
Inventor
J. W. Markham
Witnesses
by C. A. Snow & Co.
Attorneys

UNITED STATES PATENT OFFICE.

JAMES W. MARKHAM, OF ARMSTRONG, INDIANA.

STEERING-WHEEL LOCK.

1,328,882.  Specification of Letters Patent.  Patented Jan. 27, 1920.

Application filed August 3, 1917. Serial No. 184,282.

*To all whom it may concern:*

Be it known that I, JAMES W. MARKHAM, a citizen of the United States, residing at Armstrong, in the county of Vanderburg and State of Indiana, have invented a new and useful Steering-Wheel Lock, of which the following is a specification.

The present invention relates to a lock adapted especially for use upon the steering wheel of an automobile, whereby the theft of the machine can be frustrated, the construction being such that the steering wheel is disconnected from the shaft or spindle when the car is vacated, so that the wheel will merely turn loosely and not operate the steering gear, a special key being necessary for connecting the wheel with the steering gear to successfully operate the machine.

It is the object of the invention to provide a novel and improved device of that character for connecting and disconnecting the steering wheel and its shaft or stem.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:—

Figure 1 is a diametrical section of a steering wheel showing the invention applied thereto, portions being shown in elevation.

Fig. 2 is a sectional detail on the line 2—2 of Fig. 1.

In the drawing, the numeral 1 designates the steering shaft or stem, and in carrying out the invention, a cylindrical head or bushing 2 is secured on the upper terminal of said shaft or spindle 1, the head 2 having a downwardly opening bore 3 to receive the shaft 1, and the upper end of said bore is threaded, as at 4, to screw onto the shaft. The head 2 is prevented from unscrewing by means of a key 5 inserted upwardly within the head 2 and engaging said shaft. The hub 6 of the steering wheel 7 is fitted for rotation on the head 2, said head being provided at its lower end with an outstanding flange 8 supporting the hub. The head is provided at its upper end with a threaded socket 9 in which a plug 10 is threaded, and said plug has an outstanding flange 11 overlapping the hub 6 and holding it in place on the head. The plug 10 is prevented from unscrewing by means of a screw 12 or similar retaining element extending downwardly through the plug and engaging the head 2.

The hub 6 is provided with an outstanding radial lug or boss 13 in which is rotatable, radially of the head 2 and hub 6, a key barrel 14 slotted to receive a suitable key 15. Tumblers 16 are mounted within the lug 13 for preventing the barrel 14 from being rotated unless a proper key is inserted, the tumblers being spring pressed and divided whereby when the key 15 is inserted, the divisions of the tumblers will coincide with the periphery of the barrel 14, thus permitting said barrel to be rotated.

The means for locking the steering wheel to the shaft 1 is controlled by the barrel 14, the lug 13 having a bore 17 extending through its inner end in alinement with the barrel 14, and a bolt 18 is threaded within said bore and its inner end is reduced to project into a sprocket or cavity 19 with which the periphery of the head 2 is provided within the hub 6, said bolt being movable through the hub from the bore 17. In order to rotate said locking bolt 18, it is provided with a longitudinal recess 20 of square or non-circular cross section, and the inner end of the key barrel 14 is provided with a reduced extension 21 of square or non-circular outline and fitting slidably within the recess 20, whereby the bolt or screw is constrained to turn with the barrel 14 but can move longitudinally to and from it. A number of the sockets 19 can be provided in the head 2, if desired, so that the bolt 18 can be moved into engagement with the head 2 at various positions of the wheel.

During the operation of the machine, the bolt 18 projects into the socket 19, whereby the steering wheel is connected to the shaft 1 to rotate it. When the operator leaves the machine, the key 15 is inserted into the barrel 14 and said barrel is rotated a number of times, which through the extension 21 will rotate the bolt 18 so as to screw it toward and against the barrel, thereby retracting the end of the bolt from the socket 19. This disconnects the wheel 7 from the shaft 1, so as the wheel will simply turn loosely, thereby preventing the operation of the steering gear by an unauthorized person. To operate the automobile, the key barrel 14 must be rotated a number of times to project the bolt 18 into the socket 19. The operation of the bolt 18 is therefore rendered practical and serviceable.

Having thus described the invention, what is claimed as new is:—

In combination with a steering shaft, a head keyed to said shaft, said head having a lateral opening, and an annular flange adjacent the bottom of the head, a steering wheel having a hub positioned on the head and engaging the flange, a lug integral with the hub, said lug having a threaded opening, adapted to register with the opening of the head, a bolt threaded throughout a portion of its length and positioned in the threaded opening of the lug, one end of said bolt adapted to move into the opening of the head for locking the head and hub together, said bolt having a squared recess, a key barrel having a reduced extension fitted in the squared recess, for rotating the bolt when the barrel is rotated, key mechanism for rotating the barrel, and means for forcing the hub into engagement with the flange.

In testimony that I claim the foregoing as my own, I have hereto affixed my signature in the presence of two witnesses.

JAMES W. MARKHAM.

Witnesses:
 M. J. SWEENEY,
 S. G. ARTINGSTALL, Jr.